United States Patent [19]

Ichikawa

[11] Patent Number: 4,700,290
[45] Date of Patent: Oct. 13, 1987

[54] NUMERICAL CONTROL SYSTEM
[75] Inventor: Toru Ichikawa, Aichi, Japan
[73] Assignee: Mitsubishi Denki Kabushiki Kaisha, Tokyo, Japan
[21] Appl. No.: 5,394
[22] Filed: Jan. 9, 1987

Related U.S. Application Data

[63] Continuation of Ser. No. 612,950, May 23, 1984, abandoned.

[30] Foreign Application Priority Data

May 23, 1983 [JP] Japan .................................. 58-90270
May 23, 1983 [JP] Japan .................................. 58-90269

[51] Int. Cl.[4] .......................... G06F 3/04; G06F 15/46
[52] U.S. Cl. .................................... 364/191; 364/171; 364/180; 364/474
[58] Field of Search ............................. 364/167–171, 364/180–182, 188–193, 474, 475, 200, 900

[56] References Cited

U.S. PATENT DOCUMENTS

| 3,634,662 | 1/1972 | Slawson | 364/192 X |
| 3,816,723 | 6/1974 | Slawson | 364/192 X |
| 4,078,195 | 3/1978 | Mathias et al. | 364/474 |
| 4,209,847 | 6/1980 | Noda et al. | 364/167 X |
| 4,292,666 | 9/1981 | Hill et al. | 364/900 |
| 4,490,781 | 12/1984 | Kishi et al. | 364/171 |
| 4,513,366 | 4/1985 | Munekata et al. | 364/167 |
| 4,547,854 | 10/1985 | Hashimoto et al. | 364/474 |
| 4,550,375 | 10/1985 | Sato et al. | 364/167 |
| 4,550,378 | 10/1985 | Nazawa et al. | 364/474 |
| 4,591,968 | 5/1986 | Nozawa et al. | 364/191 X |

FOREIGN PATENT DOCUMENTS 0076328 10/1982 European Pat. Off. .

Primary Examiner—Jerry Smith
Assistant Examiner—John R. Lastova
Attorney, Agent, or Firm—Sughrue, Mion, Zinn, Macpeak & Seas

[57] ABSTRACT

Message sentences are successively displayed on a display unit such as a CRT according to an operator control procedure, and control items or selected items are displayed on the display unit as menu sentences dependent on or independently of the messages. The operator selects a desired item from the displayed items. At the time of generating a program, erroneous operations by the operator are checked against predetermined priority orders of operating modes. Only addresses necessary for the operating modes are used so that the control procedure is patternized.

3 Claims, 12 Drawing Figures

(i) OPERATION MODE MENU

| AUTOMATIC CONTINU-OUS | SINGLE BLOCK | MANUAL LOW SPEED | MANUAL HIGH SPEED | MANUAL HANDLE | PROGRAM GENER-ATION | | | |

(ii) CRT SCREEN MENU

| POSITION | COMMAND | PROGRAM | TOOL DATA | SELF-DIAGNOSIS | PARAMETER | | | |

(iii) AUXILIARY FUNCTION MENU

| PROGRAM ENDING | SPINDLE CW | SPINDLE CCW | SPINDLE OFF | COOLANT ON | COOLANT OFF | | | |

(iv) DATA EDITING MENU

| ONE-LINE INSERT | ONE-LINE ERASE | PROGRAM ERASE | FULL ERASE | | | | | |

FIG. 6

| | | | | | | | | | |
|---|---|---|---|---|---|---|---|---|---|
| G | X | Y | Z | 4TH | | | | | |

(a) ADDRESSING MENU
    MENU GROUP A NO. 1

| | D | H | F | M | S | T | B |
|---|---|---|---|---|---|---|---|

(b) ADDRESSING MENU
    MENU GROUP A NO. 2

| I | N | O | | | | | | | EOB |
|---|---|---|---|---|---|---|---|---|---|

(c) ADDRESSING MENU
    MENU GROUP A NO. 3

| | G | X | Y | Z | 4TH | R | I | J | K |
|---|---|---|---|---|---|---|---|---|---|

(d) ADDRESSING MENU
    MENU GROUP B NO.1

| | P | D | H | F | M | S | T | B |
|---|---|---|---|---|---|---|---|---|

(e) ADDRESSING MENU
    MENU GROUP B NO. 2

| I | N | O | | | | | | | EOB |
|---|---|---|---|---|---|---|---|---|---|

(f) ADDRESSING MENU
    MENU GROUP B NO.3

| G CODE | MODAL GROUP | FUNCTION | ADDRESS ||||||| OTHERS (S,M,ETC.) |
|---|---|---|---|---|---|---|---|---|---|
| | | | X,Y,Z | F | I,J,K | P | Q | R | |
| G00 | A | POSITIONING | TERMINAL COORDINATE | FEED SPEED | △ | △ | △ | △ | |
| G01 | A | LINEAR INTERPOLATION | TERMINAL COORDINATE | FEED SPEED | | | | | |
| G02 | A | ARC INTERPOLATION (CW) | | | CENTRAL COORDINATE | REPETITION OF HELICAL | | SPECIFYING RADIUS | |
| G03 | A | ARC INTERPOLATION (CCW) | | | | | | | |
| G04 | ※ | DWELL | | | △ | DWELL TIME | | | |
| G17 | C | PLANE SELECTION XY | | | | | | | |
| G18 | C | PLANE SELECTION ZX | | | | | | | |
| G19 | C | PLANE SELECTION YZ | | | | | | | |
| G28 | ※ | RETURN TO 1ST ORIGIN I | INTERMEDIATE COORDINATE | | | | | | |
| G29 | ※ | RETURN TO 1ST ORIGIN II | TERMINAL COORDINATE AFTER RETURN | | | | | | |
| G30 | ※ | RETURN TO 2ND ORIGIN | INTERMEDIATE COORDINATE | | | | | | |
| G33 | A | THREAD CUTTING | TERMINAL COORDINATE | THREAD PITCH | | | | | |
| G40 | D | CANCEL OF TOOL DIAMETER COMPENSATION | | FEED SPEED | | | | | |
| G41 | D | TOOL DIAMETER COMPENSATION ON LEFT SIDE | | | | | | | |
| G42 | D | TOOL DIAMETER COMPENSATION ON RIGHT SIDE | | | | | | | |
| G73 | E | HIGH-SPEED DEEP-HOLE CYCLE | POSITIONING COORDINATE | | △ | △ | △ | △ | |
| G83 | E | DEEP-HOLD CYCLE | | | | DWELL TIME | CUTTING SHIFT | R-POINT COORDINATE | |
| G90 | J | ABSOLUTE COMMAND | | | | | | | |
| G91 | J | INCREMENTAL COMMAND | | | | | | | |
| G94 | K | ASYNCHRONOUS FEEDING | | | | | | | |
| G95 | K | SYNCHRONOUS FEEDING | | | | | | | |

| G CODE | MODAL GROUP | MENU GROUP | FUNCTION | ADDRESS ||||||| OTHERS (S,M,ETC.) |
|---|---|---|---|---|---|---|---|---|---|---|
| | | | | X,Y,Z,4TH | F | I,J,K | P | Q | R | |
| G00 | A◎ | A | POSITIONING | TERMINAL COORDINATE | FEED SPEED | △ | △ | △ | △ | |
| G01 | A | A | LINEAR INTERPOLATION | TERMINAL COORDINATE | FEED SPEED | | | | | |
| G02 | A | B | ARC INTERPOLATION (CW) | | | CENTRAL COORDI-NATE | REPETI-TION OF HELICAL | | SPECI-FYING OR RADIUS | |
| G03 | A | B | ARC INTERPOLATION (CCW) | | | | | | | |
| G04 | ※ | | DWELL | | | △ | DWELL TIME | | | |
| G17 | C◎ | | PLANE SELECTION XY | | | | | | | |
| G18 | C | | PLANE SELECTION ZX | | | | | | | |
| G19 | C | | PLANE SELECTION YZ | | | | | | | |
| G28 | ※ | A | RETURN TO 1ST ORIGIN I | INTERMEDIATE COORDINATE | | | | | | |
| G29 | ※ | A | RETURN TO 1ST ORIGIN II | TERMINAL COORDINATE AFTER RETURN | | | | | | |
| G30 | ※ | A | RETURN TO 2ND ORIGIN | INTERMEDIATE COORDINATE | | | | | | |
| G33 | A | A | THREAD CUTTING | TERMINAL COORDINATE | THREAD PITCH | | | | | |
| G40 | D◎ | | CANCEL OF TOOL DIAMETER COMPENSATION | | | | | | | |
| G41 | D | | TOOL DIAMETER COMPENSATION ON LEFT SIDE | | | | | | | |
| G42 | D | | TOOL DIAMETER COMPENSATION ON RIGHT SIDE | | | | | | | |
| G73 | E | C | HIGH-SPEED DEEP-HOLE CYCLE | | FEED SPEED | | △ | △ | △ | |
| G80 | E◎ | C | CANCEL OF FIXED CYCLE | | | | | | | |
| G83 | E | C | DEEP-HOLD CYCLE | POSITIONING COORDINATE | | | DWELL TIME | CUTTING SHIFT | R-POINT COORDI-NATE | |
| G90 | J | | ABSOLUTE COMMAND | | | | | | | |
| G91 | J◎ | | INCREMENTAL COMMAND | | | | | | | |
| G94 | K◎ | | ASYNCHRONOUS FEEDING | | | | | | | |
| G95 | K | | SYNCHRONOUS FEEDING | | | | | | | |

NUMERICAL CONTROL SYSTEM

This is a continuation of application Ser. No. 612,950, filed May 23, 1984, now abandoned.

BACKGROUND OF THE INVENTION

The present invention relates to an NC (Numerical Control) system having a display unit such as a CRT (Cathode-Ray Tube) and which is operable on an interactive basis.

Figure 1:
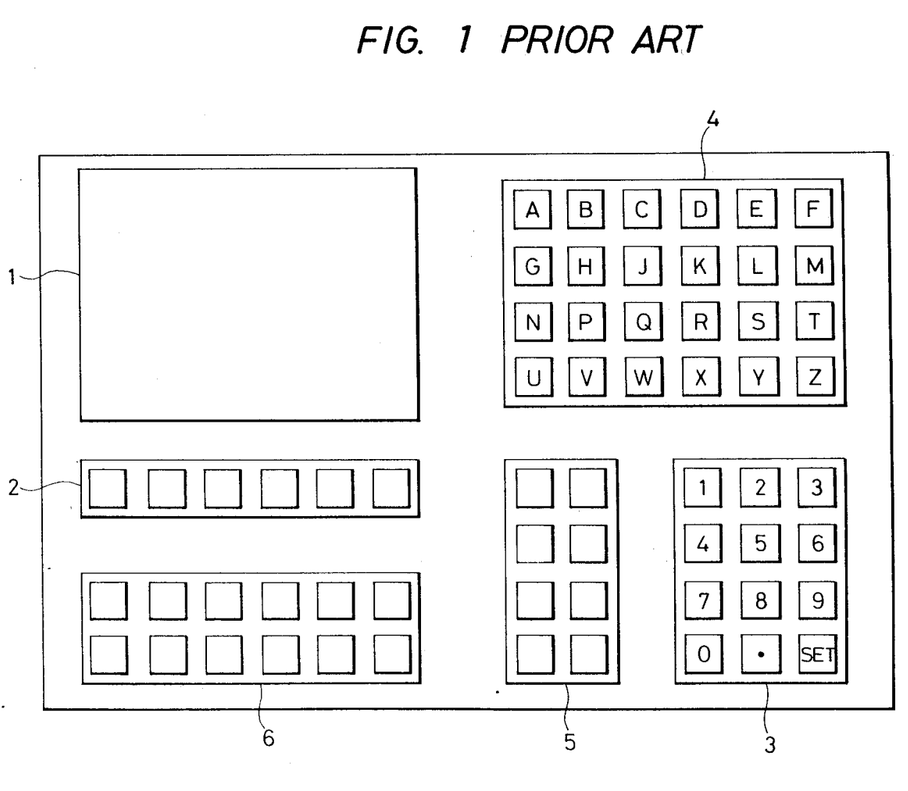
FIG. 1 is a front elevational view of a control panel incorporating a CRT in a conventional NC system.
Figure 2:
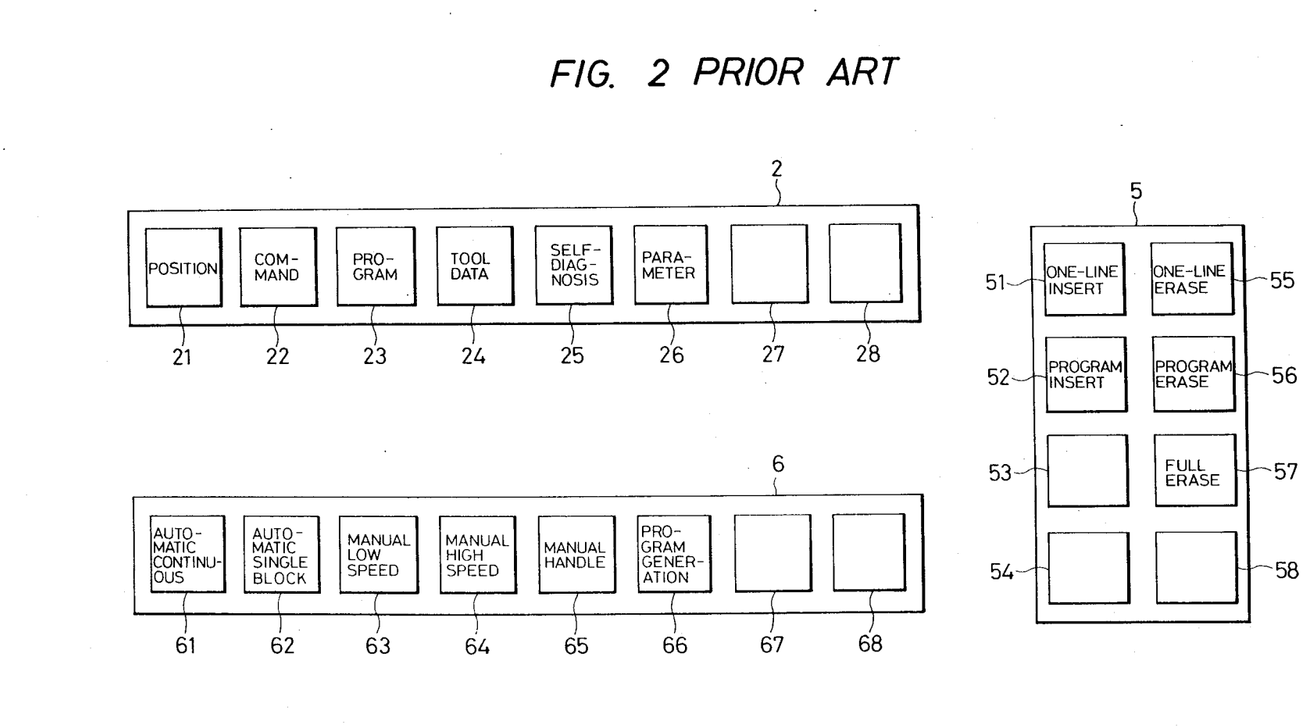
FIG. 2 is a front elevational view of certain sections of the control panel shown in FIG. 1.

FIG. 1 of the accompanying drawings illustrates a control panel of a conventional NC system having a CRT, and FIG. 2 shows sections of the control panel in greater detail.

The control panel has a CRT 1, and a display-image selecting key group 2 for selecting display images on the CRT 1. The key group 2 includes a plurality of keys 21 through 28, a data key group (numeric keyboard) 3 for entering data, an address key group 4 composed of alphabetical keys for distinguishing data contents, a data editing key group 5 composed of a plurality of keys 51 through 58 used for editing data entered on the CRT 1, and a mode selecting key group 6 composed of a plurality of keys 61 through 68 used for selecting operating modes of the NC system and a machine being controlled thereby. These various keys are associated with respective switches.

Figure 3:
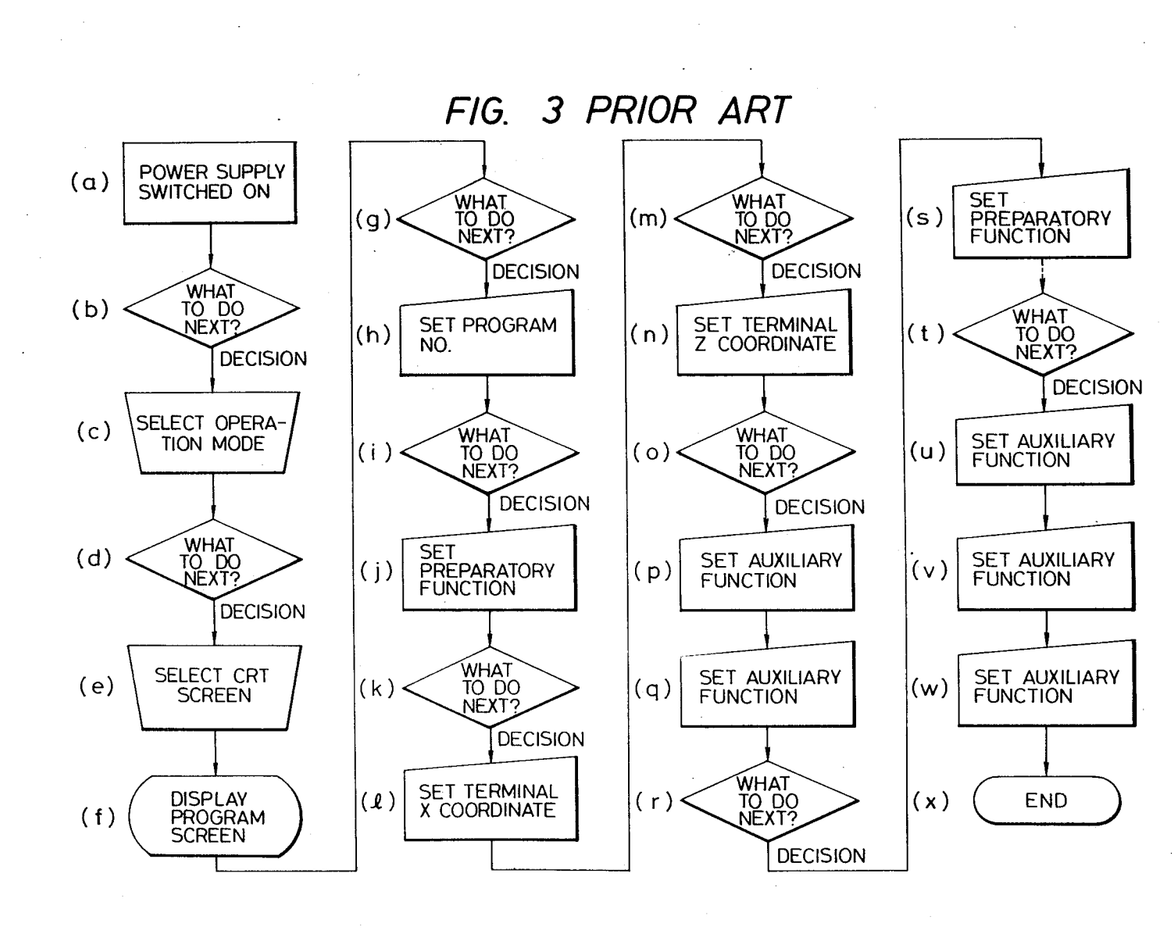
FIG. 3 is a flowchart showing a control procedure for the conventional NC system.

The procedure to be followed by an operator in entering a machining program through the control panel will be described with reference to the flowchart of FIG. 3.

First, the operator switches on a power supply in a step (a). Then, the operator decides what to do next dependent on the work to be done by a machining program to be entered in a step (b). In the illustrated example, a program generation switch 66 in the mode selecting key group 6 is depressed in a step (c) for selecting an operating mode in entering the machining program. A program switch 23 in the display-image selecting key group 2 is depressed in a step (e) for selecting a display image on the CRT 1, and an image for generating the machining program is displayed on the CRT 1 in a step (f). The operator then decides what to do next in step (g): in this example he depresses a "p" switch which is pre-set in the address key group 4 and a "1" switch, a "6" switch, and a setting switch which are coded in the data key group 3 for setting a program number in a step (h). The operator also depresses a "G" switch in the address key group 4 and an "O" switch and a "setting" switch in the data key group 3 for setting a preparatory function in a step (j).

Then, the operator decides what to do next in a step (k), and here depresses an X-switch in the address key group 4 and a "2" switch, a "4" switch, the "6" switch, a "." switch, a "3" switch, and the "setting" switch in a step (l) to establish that the X coordinate of a target positioning point is "246.3". Likewise, in deciding what to do next in a step (m), the operator depresses a "Z" switch in the address key group 4 and the "6" switch, the "2" switch, the "3" switch, the "." switch, a "5" switch, and the "6" switch in the data key group 3 in a step (n) to establish that the Z coordinate of the target positioning point is "623.56". Thereafter, the operator depresses an "M" switch in the address key group 4 and the "3" switch and the "setting" switch in the data key group 3 in a step (p) for setting auxiliary functions such as setting of a spindle and starting and stopping of a coolant, for example. All necessary auxiliary functions are set in a step (q) by depressing the "M" switch in the address key group 4 and the numerical keys in the data key group dependent on the auxiliary functions to be set.

Subsequently, when the operator decides what to do next in a step (r), he depresses a "G" switch in the address key group 4 and the "1" switch and the "setting" switch in the data key group 3 for setting a preparatory function in a step (s). Then, the operator repeats the decision and setting operations while viewing a process sheet which has been prepared in advance, and sets auxiliary functions as necessary to thereby complete the generation of the program in a step (x).

With the prior NC system thus arranged, the operator has to make decisions many times and operate on the control panel highly frequently. This is disadvantageous in that the procedure is complex and not efficient. The control panel is composed of a large number of parts, and hence requires many wiring and assembly steps in its manufacture and takes up a large space. As more and more functions are added to the NC system, the above problems become more and more severe.

SUMMARY OF THE INVENTION

It is an object of the present invention to provide an NC system having means for successively displaying messages on a display unit such as a CRT according to the procedure followed by an operator, and means for displaying menus indicative of control or selection of items dependent on or independently of the messages on the CRT and for allowing the operator to select a desired item from the displayed items. Accordingly, the operating procedure is patternized to reduce the burden on the operator, and the overall NC system is simplified in itself.

An improved NC system of this type is described in PCT International Application No. PCT/JP82/00115 (international filing date: Apr. 9, 1982) filed by the same applicant. According to the NC system disclosed in this earlier application, if an entered G code is contradictory to a previously specified G code (for example, information on tool compensation is changed while a deep-hole cycle is being executed or a plane is changed during arc interpolation), no decision is made, but such an entered G code is executed so that an unexpected machined shape tends to result. Since addresses are entered selectively by the operator, address selection errors or errors for entering data at unwanted addresses are liable to occur.

According to the present invention, priority G-code execution orders are pre-set such as:
(1) when executing a newly specified G code without affecting a previously specified G code;
(2) when cancelling a previously specified G code and executing a newly specified G code;
(3) when neglecting a newly specified G code and executing a previously specified G code; and
(4) when issuing an alarm by determining a newly specified G code as improper.

There are provided an operation discriminating means for determining whether a G code is to be executed or not each time it is specified, and an address selecting means for selecting an address required by the determined operating mode from many addresses.

DESCRIPTION OF THE PREFERRED EMIBODIMENTS

A preferred embodiment of the present invention will be described with reference to FIGS. 4, 5, and 7 through 11.

Figure 4:
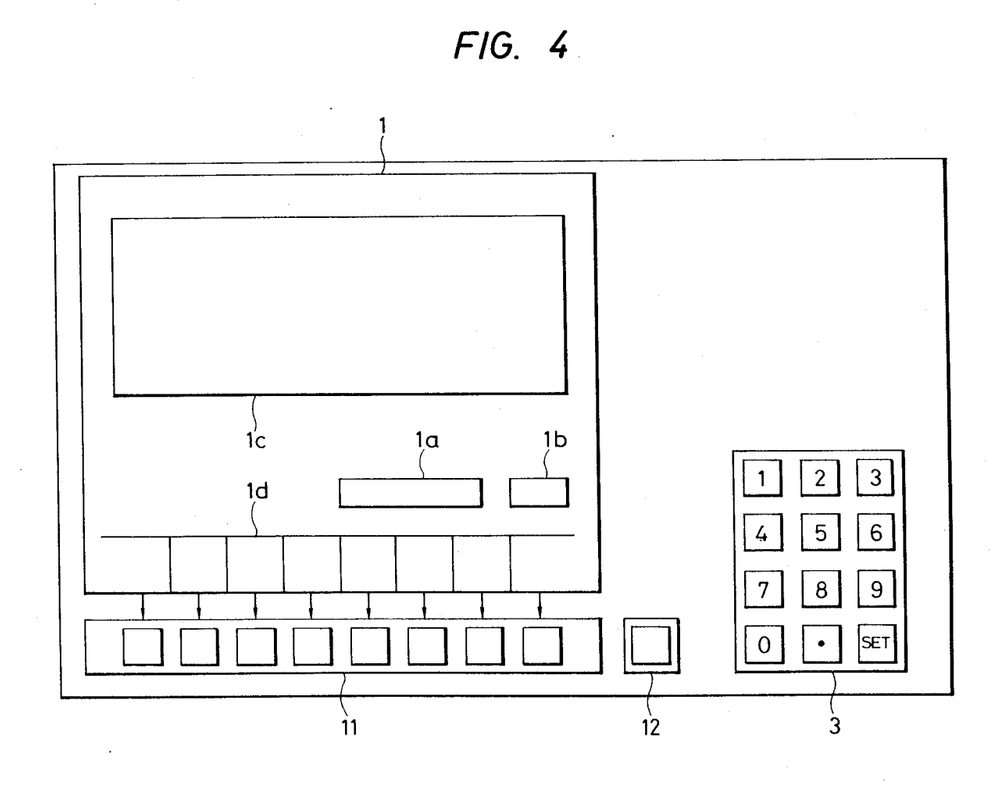
FIG. 4 is a front elevational view of a control panel in a numerical control system according to the present invention.

FIG. 4 shows a control panel employed in accordance with the present invention. A CRT 1 has a screen capable of displaying characters in 24 lines and 80 columns and having a message display section 1a, an input data display section 1b, a set data display section 1c, and a menu display section 1d. The control panel has a menu selecting key group 11 having a plurality of switches corresponding to items in the menu display section 1d, and a menu incrementing key 12 for manually incrementing menu pages. The page of the menu displayed on the menu display section 1d can be renewed by the contents of the menu successively displayed on the message display section 1a or by manually depressing the menu incrementing key 12.

Figure 5:
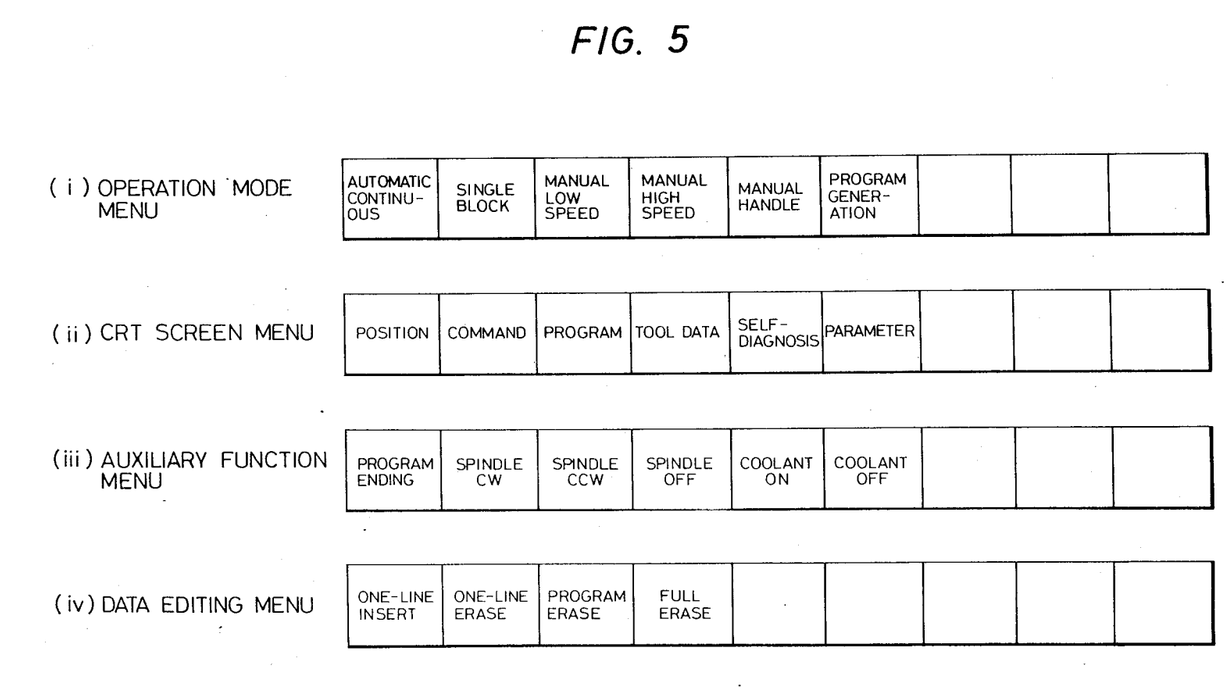
FIGS. 5 and 6 are views showing control items to be displayed as menus.

FIG. 5 illustrates control items for the respective menu pages to be displayed on the menu display section 1d, the control items including an operating mode menu (i), a CRT screen menu (ii), an auxiliary function menu (iii), and a data editing menu (iv). Any desired item can be accessed by depressing the switch in the menu selecting key group 11 which corresponds to the desired item in the displayed page. The content of the message displayed in the message display section 1a can successively be responded to by entering data into the input data section 1b with a data key group 3, or by selecting the desired control item in the menu displayed on the menu display section 1d while the message is being displayed. Therefore, the operator may proceed with the control operation while being guided by the displayed message and while responding to the same.

Any page such as of the data editing menu which cannot be displayed on a message-related basis can be displayed manually by depressing the menu incrementing key 12.

Figure 7:
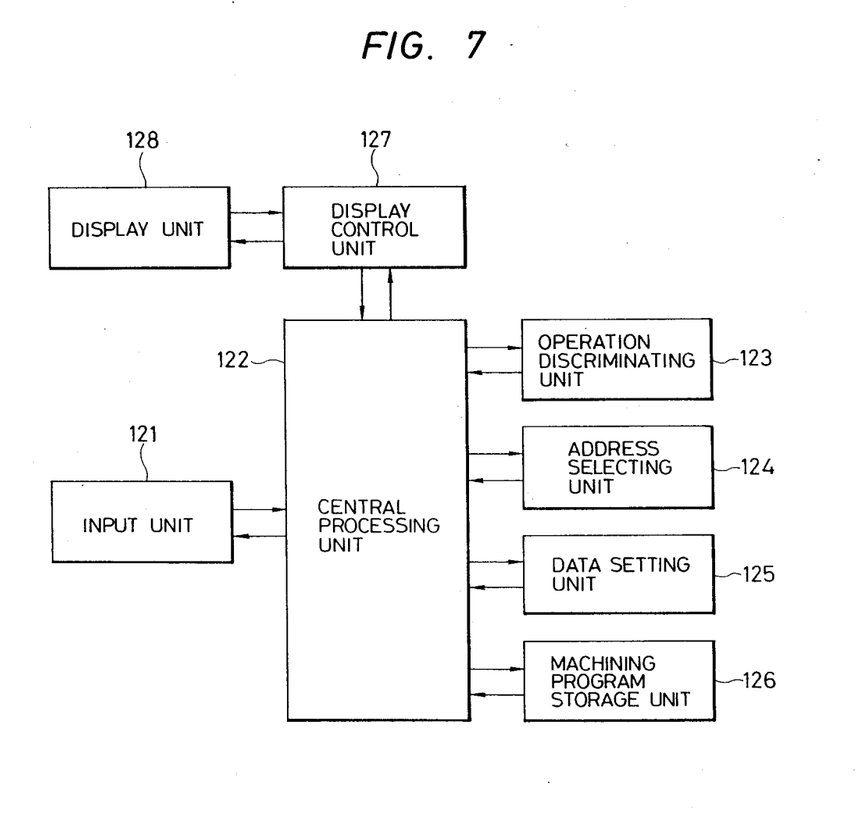
FIG. 7 is a block diagram of the numerical control system.

FIG. 7 shows the NC system according to the present invention. The NC system has an input unit 121, a central processing unit (CPU) 122, an operation discriminating unit 123 for classifying operating modes as set into modal (hold) and nonmodal (nonholding) and discriminating operating modes to be executed in individual blocks, an address selecting unit 124 for selecting an address corresponding to the discriminated operating mode from among a number of addresses, a data setting unit 125 for setting data corresponding to the selected address, a machining program storage unit for storing a set machining program, and a display control unit 127 for displaying on a display unit 128 the address selected by the address selecting unit 124 as a control item (for example, a head item) and the program stored in the machining program storage unit 126.

Figure 8:
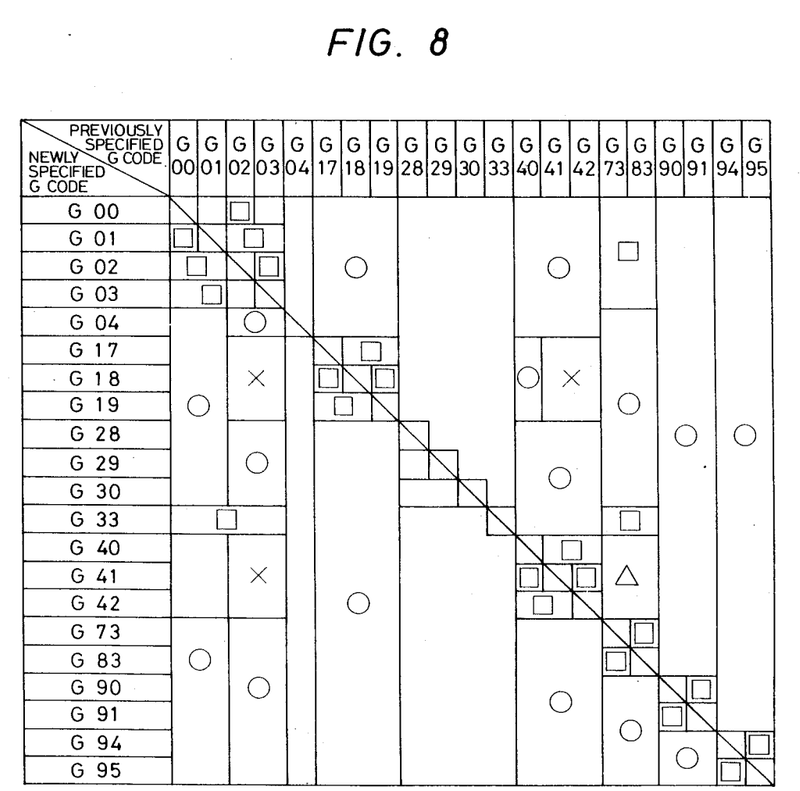
FIG. 8 is a table showing priority execution orders of operating modes.

FIG. 8 shows by way of example a priority execution order of a G code among other operating modes to be discriminated by the operation discriminating unit 123. The mark ○ in FIG. 8 means execution of a newly specified G code without affecting a previously specified G code, the mark □ means cancelling of a previously specified G code and execution of a newly specified G code, the mark Δ means execution of a previously specified G code while neglecting a newly specified G code, and the mark x means issuance of an alarm since a newly specified G code is improper.

More specifically, G codes can be classified into a group called modal in which a G code once specified is maintained effective until a next particular G code is specified, and a group called nonmodal in which a G code is effective only in a specified block. The G codes specified previously in FIG. 8 belong to the modal group and are ineffective when a new G code is specified.

Those marked with ○ are indicative of the use of a newly specified G code in combination with a previously specified G code, as when G00 (positioning), G01 (linear interpolation), G02 (CW arc interpolation), or G03 (CCW arc interpolation) is specified while a plane such as G17 (XY), G18 (ZX), or G19 (YZ) is selected.

Those marked with □ are indicative of equivalent replacement between a newly specified G Gode and a previously specified G code, as when specifying G02 (CW arc interpolation) after G01 (linear interpolation).

Those marked with Δ are indicative of a newly specified G code producing a contradictory cutting condition as when changing information on tool diameter compensation such as G40 (cancelling of tool diameter compensation), G41 (left-side tool diameter compensation), or G42 (right-side tool diameter compensation) while executing G73 (deep-hole cycle).

Those marked with x indicate when a newly specified G code produces contradiction such as a change in a machined shape, as when changing a selected plane such as G17 (XY), G18 (ZX), or G19 (YZ) while executing G02 (CW arc interpolation) or G03 (CCW arc interpolation).

Figure 9:
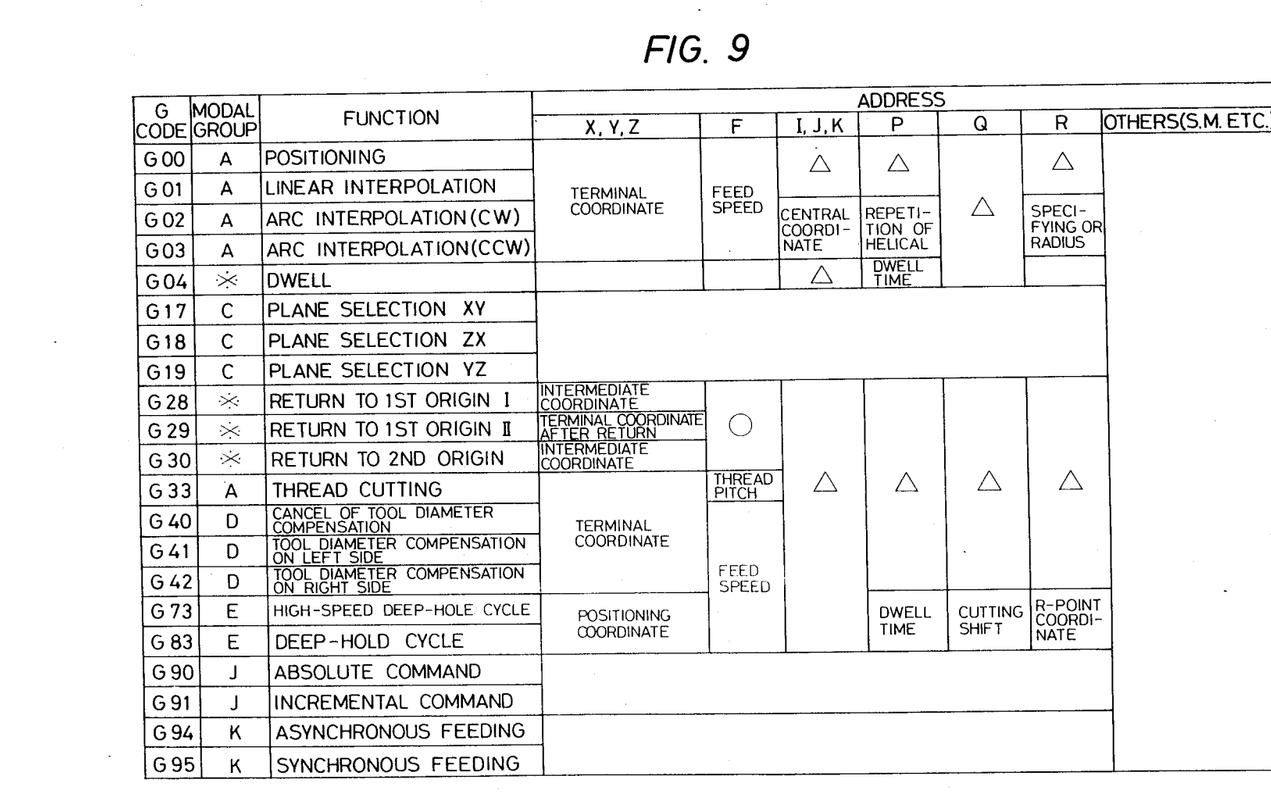
FIG. 9 is a table illustrative of the relationship between operating modes and addresses.

FIG. 9 shows the relationship between G codes and addresses which is required in the address selecting unit 124 when selecting an address needed by an operating mode discriminated by the operation discriminating unit 123. Addresses denoted in the columns X, Y, Z at G00 through G03 for example indicate that their terminal coordinates are set by the G codes. Addresses denoted by ○ in the column F at G28 through G30 for example indicate that they are renewable by the G codes. Addresses denoted by Δ in the columns I, J, K at G00 through G03 for example indicate that they are unnecessary with the G codes. Addresses denoted by the blank indicate that specifying the G codes is enough and that no address items need be specified. G17, G18 and G19 for selecting planes, G90 and G91 for selecting absolute command/incremental commands, or G94 and G95 for selecting asynchronous feeding/synchronous feeding are used for applying meanings to specified data, and are indicated with blanks.

Figure 10:
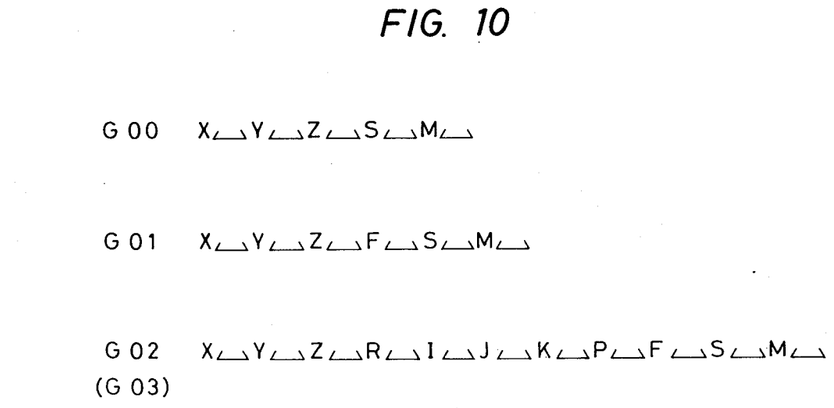
FIG. 10 is a diagram showing, by way of example, addresses to be displayed as head items.

FIG. 10 shows an example of addresses selected as head items by the address selecting unit 124. Only addresses selected as necessary by the address selecting unit are displayed as head items on the set data display section 1c in FIG. 4 to guide the operator to enter data at the required addresses.

Figure 11:
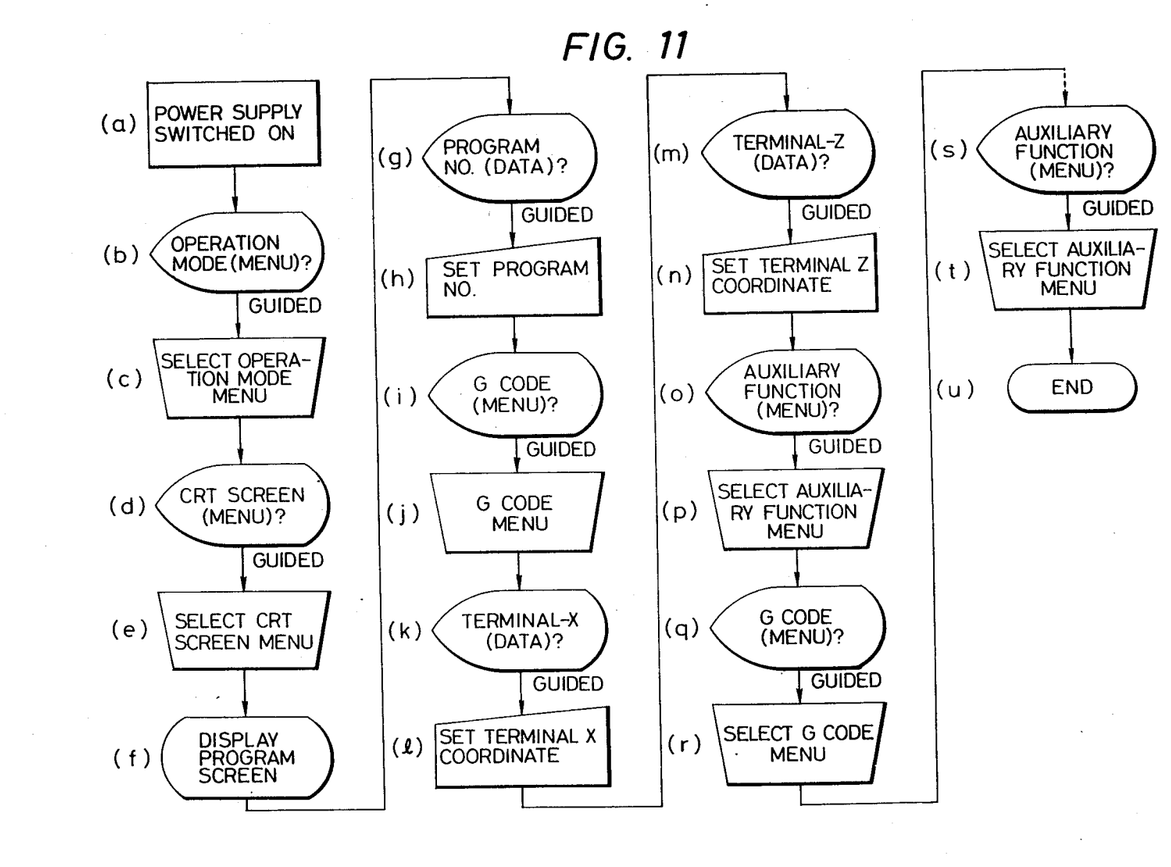
FIG. 11 is a flowchart showing a control procedure.

FIG. 11 is a flowchart of a control procedure to be followed by the operator, the control procedure having steps (a) through (u).

Operation of the arrangement shown in FIGS. 4 and 7 will be described with reference to FIG. 11 to indicate how a message is responded to, that is, how the operator answers the questions of a message. The control procedure employed for generating a program will be described for illustrative purpose.

When the operator switches on the power supply in the step (a), the CRT 1 automatically displays a message for setting an operating mode, "operating mode <menu>?" in the message display section 1a and the operating mode menu shown in FIG. 5 at (i) in the menu display section 1d in the step (b). The operator is guided by the displayed data to select "program generation" from the operating mode menu in FIG. 5 at (i), and depresses the corresponding switch in the menu selecting key group 11 in the step (c). Then, the CRT 1 automatically displays a message "CRT screen <menu>?" in the message display section 1a and the CRT screen menu in FIG. 5 at (ii) in the menu display section 1d. The operator selects "program" from the CRT screen menu and depresses the corresponding switch in the menu selecting key group 11 in the step (e).

The CRT also displays a message for generating the program, "program NO <data>" in the message display section 1a in the steps (f) and (g). The operator depresses the coded "1" and "6" switches and the "setting" switch in the data key group 3 in the step (h) to enable a program number in the input data display section 1b. The program number is thus set, and the CRT displays the message "G code <menu>?" in the message display section 1a and the "G code" in the menu display section 1d (FIG. 11(i)). The operator depresses the switch in the menu selecting key group 11, which corresponds to the "0" and the "setting" switch in the data selecting key group 3 to set positioning G0 (FIG. 11(j)).

At this time, the operation discriminating unit 124 determines whether the G code is to be set, and thereafter the CRT displays an address corresponding to the G code as a head item, as shown in FIG. 10. When the cursor is positioned at an address "X", the operator depresses the "2", "4", "6", ".", "3" keys and the "setting" switches in the data key group 3 to set the terminal X coordinate as "246.36" in the step (1). Then, when the cursor is positioned at an address "Z", the operator depresses the "6", "2", "3", ".", "5", "6" keys and the "setting" switches in the data key group 3 to set the terminal Z coordinate as "623.56" in the steps (m) and (n).

When the cursor reaches an address "M", the CRT displays a message for setting an auxiliary function, "auxiliary function <menu>?" and the auxiliary function menu shown in FIG. 5 in the step (0). The operator selects "spindle CW", "coolant ON" or the like as desired from the auxiliary function menu, and depresses the corresponding switch in the menu selecting key group 11 in the step (p). The CRT also displays a message "G code <menu>?" and "G code" in the menu, and the operator depresses the switch in the menu selecting key group 11 corresponding to "G" and the "1" switch and the "setting" switch in the data selecting key group 3 for establishing linear machining in the steps (q) and (r).

The operator subsequently repeats setting setting or menu selection while being guided by messages displayed on the basis of a predetermined program format, and depresses switches in the menu selecting key group (11) which correspond to "program ending", "spindle OFF", "coolant off" and others to complete generation of the program in the steps (s), (t) and (u).

The menus and data successively established in the foregoing manner are displayed as a completed program in the set data display section 1c on the CRT 1.

While in the illustrated embodiment the messages and the menus are indicated by ordinary words, they may be indicated by symbols or marks. Messages may be displayed by a plurality of sentences at one time instead of being displayed successively by single sentences as shown. Addresses to be displayed as head items may be displayed as divided as items to be set and items to be responded to as though they have been illustrated undivided.

ON/OFF conditions of the menus can be distinguished one from the other by reverse display of the characters on the CRT screen, causing them to flicker, or displaying them selectively in upper and lower cases.

While in the illustrated embodiment the control procedure has been described with reference to the genration of a program, it may be used for ordinary machine control with data setting items removed.

Figure 6:
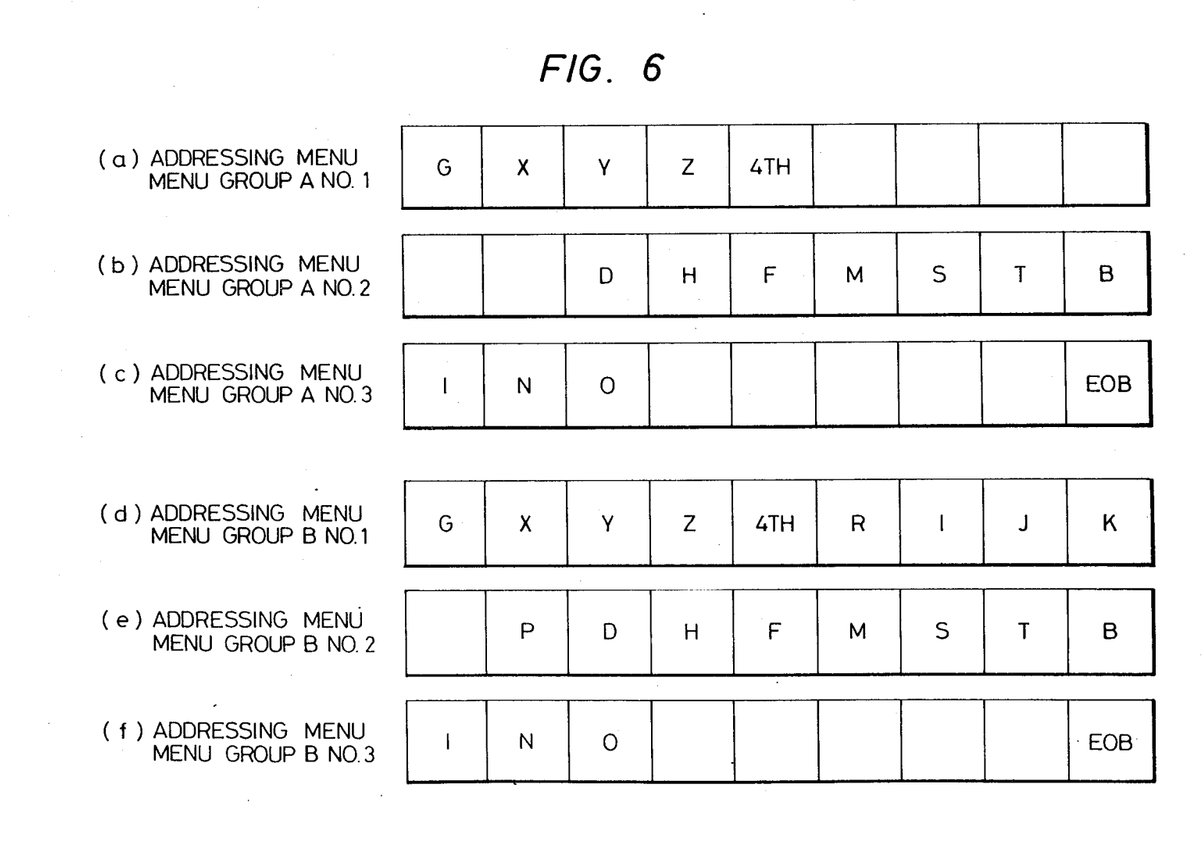

FIG. 6 illustrates another example of addresses selected as necessary by the address selecting unit which are displayed as control items. The illustrated control items are classified as menu groups rather than as G codes as shown in FIG. 5. Designated at (a) through (c) and (d) through (f) are menus accessed by the menu incrementing key. The operator can set a desired address as a head item in the set data display section 1c in FIG. 4 by using the address selecting unit 124.

Figure 12:
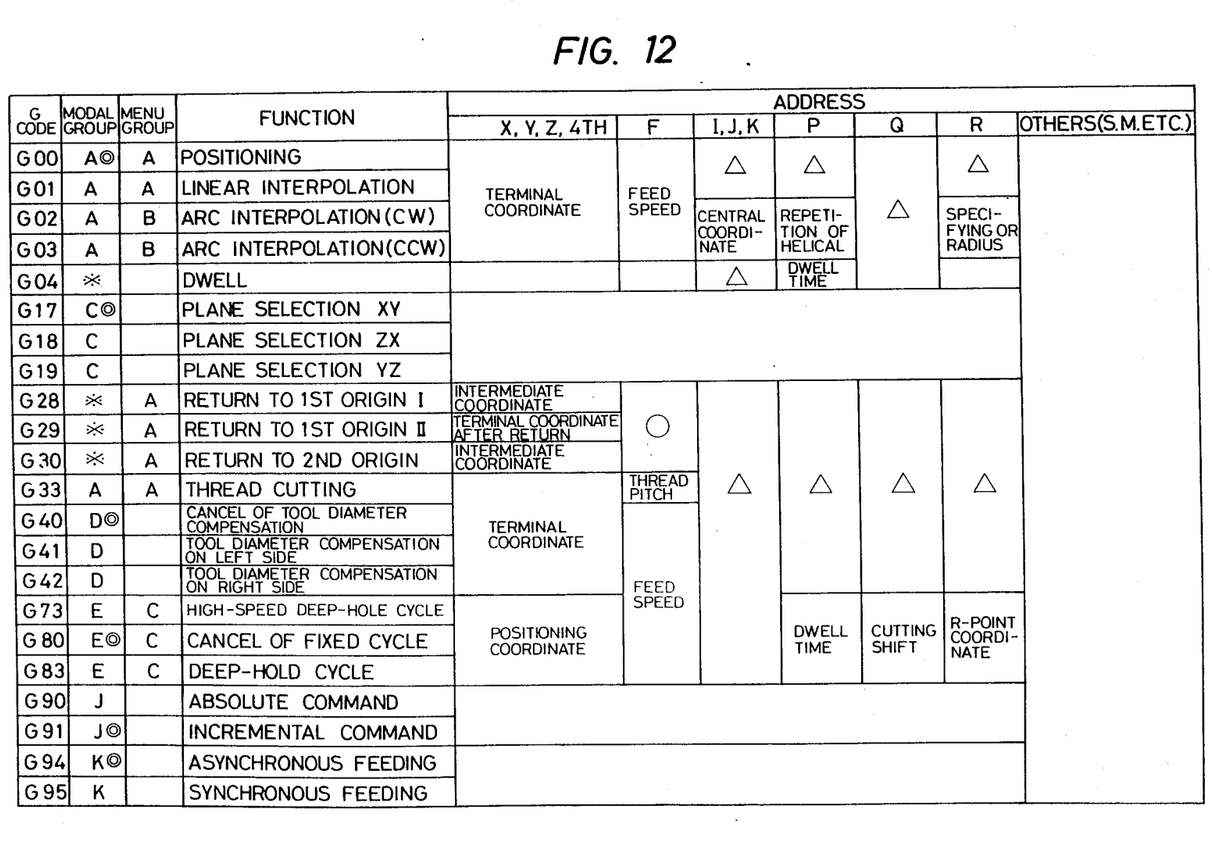
FIG. 12 is a table showing the relationship between G codes and addresses.

FIG. 12 shows the relationship between addresses and G codes for selecting addresses corresponding to the operating modes discriminated by the address selecting unit 124 from among large number of addresses. Menu groups are classified into groups for displaying addresses as menus as illustrated in FIG. 6. Those marked with O among addresses which are set by G codes are indicative of items to be responded to, and those marked with Δ are indicative of items that are unnecessary with the G codes. G17, G18 and G19 for selecting planes, G90 and G91 for selecting absolute command/incremental command, or G94 and G95 for selecting asynchronous feeding/synchronous feeding are used for applying meanings to specified data and are indicated with blank. Those marked with ⊙ in the column of the modal group are indicative of those set to an initial condition in the modal group. Other items include M, S, T, B for specifying individual functions, O for specifying a program number, N for specifying a sequence number, and D, E, H, L for specifying compensation and particular operations such as a variable and others.

The address menus shown in FIG. 9 are produced on the basis of FIG. 12. At first after the power supply has been switched on, the menu of the menu group A is displayed, and subsequently the menu of the menu group containing a previously used G code is displayed.

With the present invention, as described above, the operator effects and proceeds with patternized control by answering the questions of a displayed message through the setting of data or selection of a menu. Since an operating mode as specified is not immediately registered but registered after whether it should be executed or not has been determined, modal control is possible in which operation according to a previously registered operating mode is prevented from being affected by a specified operating mode. As only an address necessary with a selected operating mode is displayed, a format check can easily be effected to prevent data shortage or address errors.

The menu selecting keys have different functions for respective menu pages so that the number of switches on the control panel can greatly be reduced. Because the messages and menus are processed by software, changes and enlargement of the functions are facilitated.

What is claimed is:

1. In a numerical control system in which words are expressed by addresses and data, blocks are expressed by a collection of words, the blocks are divided by particular instruction codes, and a machining program is constructed of a collection of such blocks and processed successively by blocks, processing being dependent on the word indicative of an operating mode, the improvement wherein said numerical control system comprises operation discriminating means for classifying set operating modes as modal, wherein a particular one of said instruction codes once specified is maintained effective until a next particular instruction code is specified, and nonmodal, wherein one of said instruction codes is effective only in a specified block, and discriminating the operating modes to be executed in the individual blocks, wherein said operation discriminating means includes means for setting priorities among instructions entered by a user, said priority-setting means preventing both of a contradictory pair of instructions from being executed, address selecting means for selecting an address corresponding to and necessary for the discriminated operating mode from among a plurality of predetermined addresses, display means for displaying the selected address as a head item, thereby enabling the selection of a classification of specific information from a menu, means for setting data corresponding to the selected address, and means for storing a machining program, said display means including means for displaying the machining program.

2. The numerical control system according to claim 1, wherein said display means comprises a cathode-ray tube display screen having a message display section, an input data display section, a set data display section, and a menu display section disposed on said display screen.

3. In a numerical control system in which words are expressed by addresses and data, blocks are expressed by a collection of words, the blocks are divided by particular instruction codes, and a machining program is constructed of a collection of such blocks and processed successively by blocks, processing being dependent on the word indicative of an operating mode, the improvement
wherein said numerical control system comprises operation discriminating means for classifying set operating modes as modal, wherein a particular one of said instruction codes once specified is maintained effective until a next particular one of said instruction codes is specified, and nonmodal, wherein a particular one of said instruction codes is effective only in a specified block, and discriminating the operating modes to be executed in the individual blocks, wherein said operation discriminating means includes means for setting priorities among instructions entered by a user, said priority-setting means preventing both of a contradictory pair of instructions from being executed, address selecting means for selecting an address corresponding to and necessary for the discriminated operating mode from among a plurality of predetermined addresses, display means for displaying the selected address as a control item, thereby enabling specification of a particular control function from a menu, means for selecting a desired address from the control items, means for setting data corresponding to the selected address, and means for storing a machining program, said display means including means for displaying the machining program.

* * * * *